United States Patent
Nishioka et al.

(12)

(10) Patent No.: US 12,446,827 B2
(45) Date of Patent: Oct. 21, 2025

(54) BLOOD PRESSURE MEASURING DEVICE

(71) Applicants: OMRON HEALTHCARE CO., LTD., Muko (JP); OMRON CORPORATION, Kyoto (JP)

(72) Inventors: Takanori Nishioka, Kyoto (JP); Takashi Ono, Kyoto (JP); Brian Brigham, Kyoto (JP); Yoshihiko Sano, Kyoto (JP)

(73) Assignees: OMRON HEALTHCARE CO., LTD., Muko (JP); OMRON CORPORATION, Kyoto (JP)

( * ) Notice: Subject to any disclaimer, the term of this patent is extended or adjusted under 35 U.S.C. 154(b) by 163 days.

(21) Appl. No.: 16/913,203

(22) Filed: Jun. 26, 2020

(65) Prior Publication Data
US 2020/0323490 A1 Oct. 15, 2020

Related U.S. Application Data

(63) Continuation of application No. PCT/JP2018/046236, filed on Dec. 17, 2018.

(30) Foreign Application Priority Data

Dec. 28, 2017 (JP) .................................. 2017-253188

(51) Int. Cl.
*A61B 5/00* (2006.01)
*A61B 5/022* (2006.01)
*A61B 5/021* (2006.01)

(52) U.S. Cl.
CPC .......... *A61B 5/681* (2013.01); *A61B 5/02233* (2013.01); *A61B 5/02141* (2013.01); *A61B 2560/0431* (2013.01)

(58) Field of Classification Search
CPC . A61B 5/681; A61B 5/02233; A61B 5/02225; A61B 5/021; A61B 5/024; A61B 5/02141; A61B 2560/0431
(Continued)

(56) References Cited

U.S. PATENT DOCUMENTS 6,918,879 B2 * 7/2005 Ting .................... A61B 5/022
600/503
2003/0004421 A1 1/2003 Ting et al.
(Continued)

FOREIGN PATENT DOCUMENTS

DE      20219565 U1    3/2003
JP    2007-175185 A    7/2007
(Continued)

OTHER PUBLICATIONS

Oct. 28, 2019 International Preliminary Report on Patentability issued in International Patent Application No. PCT/JP2018/046236.
(Continued)

*Primary Examiner* — Alex M Valvis
*Assistant Examiner* — Grace L Rozanski
(74) *Attorney, Agent, or Firm* — Oliff PLC

(57) ABSTRACT

A blood pressure measuring device comprising: a device main body; a curler configured to bend along a circumferential direction of a wrist, including one end and another end separated from each other, and further configured to be fixed to the device main body; a strap provided at a symmetrical position on an outer side surface of the device main body and configured to cover an outer surface of the curler; a cuff structure provided on an inner peripheral surface of the curler and configured to be inflated by a fluid; and a power feed unit provided to the curler.

3 Claims, 13 Drawing Sheets

(58) Field of Classification Search
USPC .......................................................... 600/491
See application file for complete search history.

(56) References Cited

U.S. PATENT DOCUMENTS

| | | | | |
|---|---|---|---|---|
| 2003/0088267 | A1* | 5/2003 | Itonaga | A61B 5/02233 |
| | | | | 606/202 |
| 2006/0135872 | A1* | 6/2006 | Karo | A61B 5/02141 |
| | | | | 600/499 |
| 2011/0112412 | A1* | 5/2011 | Sano | A61B 5/02233 |
| | | | | 600/499 |
| 2017/0000222 | A1* | 1/2017 | Lee | G04G 17/06 |
| 2017/0123487 | A1* | 5/2017 | Hazra | G06F 3/0482 |
| 2017/0235341 | A1* | 8/2017 | Huitema | G04G 17/08 |
| | | | | 361/679.03 |
| 2019/0374115 | A1* | 12/2019 | Higashimura | A61B 5/681 |

FOREIGN PATENT DOCUMENTS

| | | |
|---|---|---|
| JP | 2012-019457 A | 1/2012 |
| JP | 2015-112156 A | 6/2015 |
| WO | 2017/119370 A1 | 7/2017 |
| WO | 2018/123374 A1 | 7/2018 |

OTHER PUBLICATIONS

Feb. 26, 2019 International Search Report issued in International Patent Application No. PCT/JP2018/046236.

Oct. 10, 2022 Office Action issued in Chinese Patent Application No. 201880083861.7.

\* cited by examiner

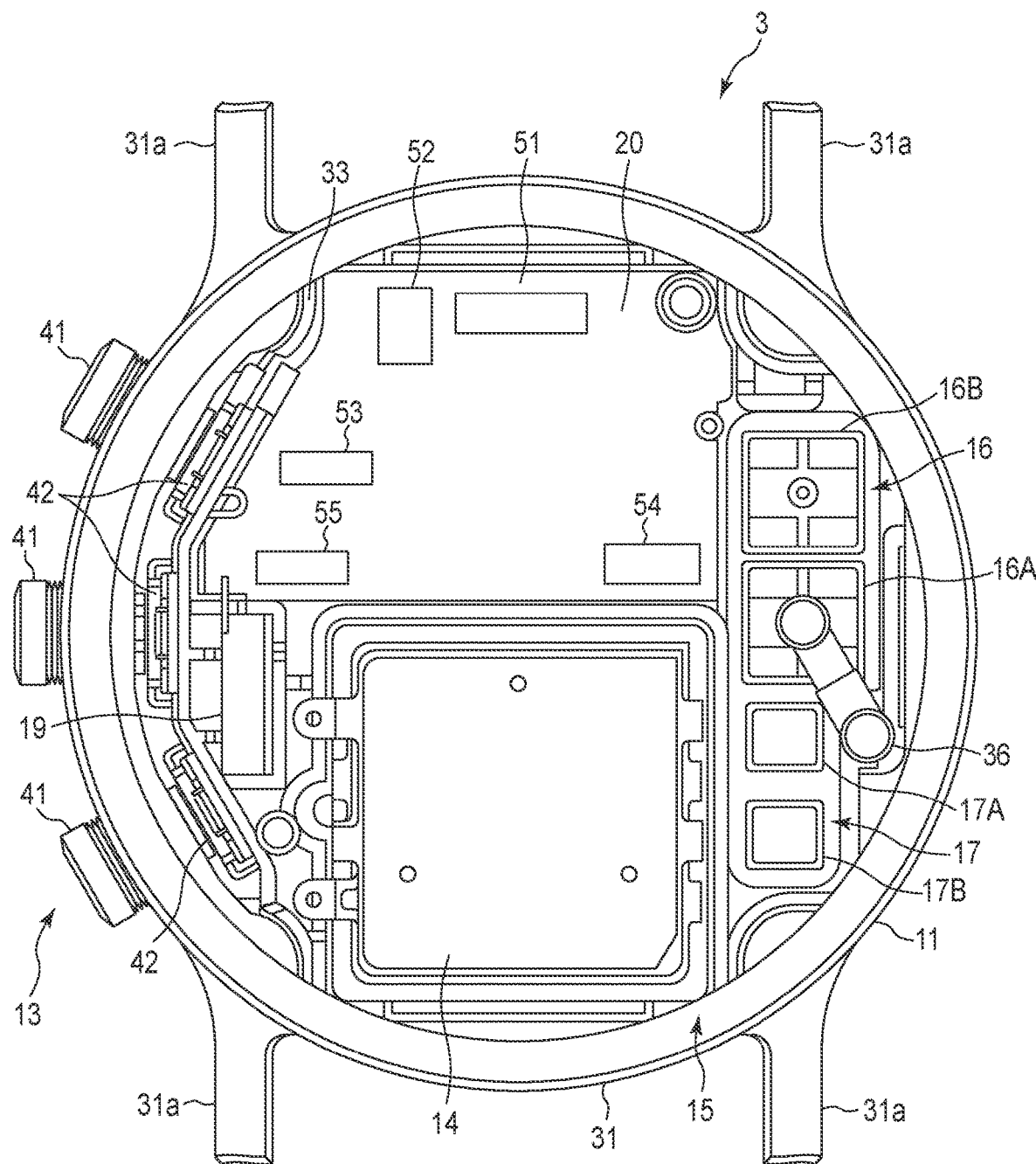
F I G. 9

BLOOD PRESSURE MEASURING DEVICE

CROSS-REFERENCE TO RELATED APPLICATIONS

This is a Continuation Application of PCT application No. PCT/JP2018/046236, filed. Dec. 17, 2018, which was published under PCT Article 21(2) in Japanese.

This application is based upon and claims the benefit of priority from Japanese Patent Application No. 2017-253188, filed Dec. 28, 2017, the entire contents of which are incorporated herein by reference.

BACKGROUND

Field

The present invention relates to a blood pressure measuring device for the measurement of blood pressure.

Description of the Related Art

A blood pressure measuring device for the use of blood pressure measurement has been utilized not only in medical facilities but also in households as a means of confirming health condition. As disclosed in Jpn. Pat. Appln. KOKAI Publication No. 2007-175185, a blood pressure measuring device measures blood pressure by detecting vibrations of an arterial wall, by, for example, wrapping a cuff around an upper arm, a wrist, or the like of a living body, inflating and deflating the cuff, and detecting the pressure of the cuff with the use of a pressure sensor.

For example, a so-called "integrated-type blood pressure measuring device", in which a cuff and a device main body that supplies a fluid to the cuff are integrally formed, is known as a "blood pressure measuring device". As an integrated-type blood pressure measuring device, for example, a configuration in which a primary battery, a secondary battery, or the like is used as a means for supplying a power source to a device main body is known.

In recent years, a blood pressure measuring device has faced requirements to be downsized to a wearable device, and such a blood pressure measuring device uses a secondary battery as a means for supplying a power source.

SUMMARY

In general, there is a high demand for downsizing of a blood pressure measuring device used as a wearable device. Therefore, the area in which a power feed unit for connecting to an external power source can be provided is restricted. For example, a power feed unit may be provided to a case of a device main body; however, since the power feed unit is exposed to the outside, the design of the device main body may be impaired. Also, if the power feed unit is exposed to the outside, water, dust, or the like may adhere to the power feed unit, or the power feed unit may be damaged when the user wears the blood pressure measuring device and performs an action. For example, to prevent the power feed unit becoming exposed to the outside, the power feed unit may be covered with a cover or the like. However, the blood pressure measuring device requires repeated charging; and attachment and detachment of the cover every time charging is performed complicates the task of connecting the power feed unit and the power feed cable to perform charging, resulting in poor usability.

According to one aspect, there is provided a blood pressure measuring device including: a device main body; a strap provided at a symmetrical position on an outer side surface of the device main body; a curler configured to bend along a circumferential direction of a wrist, including one end and another end separated from each other, and further configured to be fixed to the device main body; a cuff structure provided on an inner peripheral surface of the curler and configured to be inflated by a fluid; and a power feed unit provided to the curler.

In this aspect, the fluid includes liquid and air. The cuff structure includes a bag-shaped structure such as an air bag which is wrapped around a wrist or the like of a living body when blood pressure is measured, and inflated when a fluid is supplied thereto.

According to this aspect, since the curler is covered with the strap and the power feed unit is provided to the curler, the power feed unit is not exposed to the outside when the blood pressure measuring device is worn, but can be exposed to the outside during charging. As a result, the blood pressure measuring device can protect the power feed unit when the blood pressure measuring device is worn on the wrist, and can also suppress degradation of the design (appearance) of the blood pressure measuring device.

There is provided the blood pressure measuring device according to the above aspect, wherein the power feed unit is provided on an outer surface or an inner surface of the curler.

According to this aspect, by providing the power feed unit on the outer surface of the curler, the power feed unit provided to the curler can be covered with the strap. Also, by providing the power feed unit on the inner surface of the curler, the power feed unit is covered with the living body when the blood pressure measuring device is worn. Therefore, it is possible to prevent the power feed unit from becoming exposed to the outside when the blood pressure measuring device is worn. In addition, since the power feed unit can be exposed simply by turning the strap in a direction away from the curler at the time of charging, high usability is achieved.

There is provided the blood pressure measuring device according to the above aspect, wherein: the curler is configured so that an outer surface on one end side is fixed to the device main body, that said one end protrudes from the device main body, and that said one end and said another end are adjacent to each other; and the power feed unit is provided at said one end of the curler protruding from the device main body.

According to this aspect, since the power feed unit is provided at a position close to the device main body, the length from the device main body to the power feed unit can be reduced to the greatest extent possible.

There is provided the blood pressure measuring device according to the above aspect, wherein: the curler has a recess on an outer surface of the one end protruding from the device main body; and the power feed unit includes a wiring unit provided in the recess and a power feed terminal provided in the recess and connected to the wiring unit.

According to this aspect, since the wiring unit and the power feed terminal are provided in the recess of the curler, it is possible to prevent the strap from interfering with the power feed unit when the blood pressure measuring device is worn.

According to one aspect, there is provided a connector including: a rectangular plate-shaped main body provided at an end of a charging cable; a connection terminal provided to the main body and electrically connected to a power feed unit provided at an end of a curler used in a blood pressure measuring device, the curler configured to bend along a circumferential direction of a wrist and including one end and another end separated from each other; and a fixing unit configured to fix the main body to the curler with the connection terminal electrically connected to the power feed unit.

According to this aspect, the connector is fixed to the curler by the fixing unit, and the connection terminal can be electrically connected to the power feed unit. Therefore, even when the power feed unit is provided at an end of the curler, electrical connection between the connection terminal and the power feed unit can be easily performed, resulting in high usability of the connector.

The present invention can provide a blood pressure measuring device that both prevent a power feed unit from becoming exposed to the outside when the device is worn and demonstrate high usability.

BRIEF DESCRIPTION OF THE DRAWINGS

FIG. 9 is a plan view of an internal configuration of the device main body.

DETAILED DESCRIPTION

Hereinafter, an example of a blood pressure measuring device 1 according to one embodiment of the present invention will be described with reference to FIGS. 1 to 13.

Figure 1:
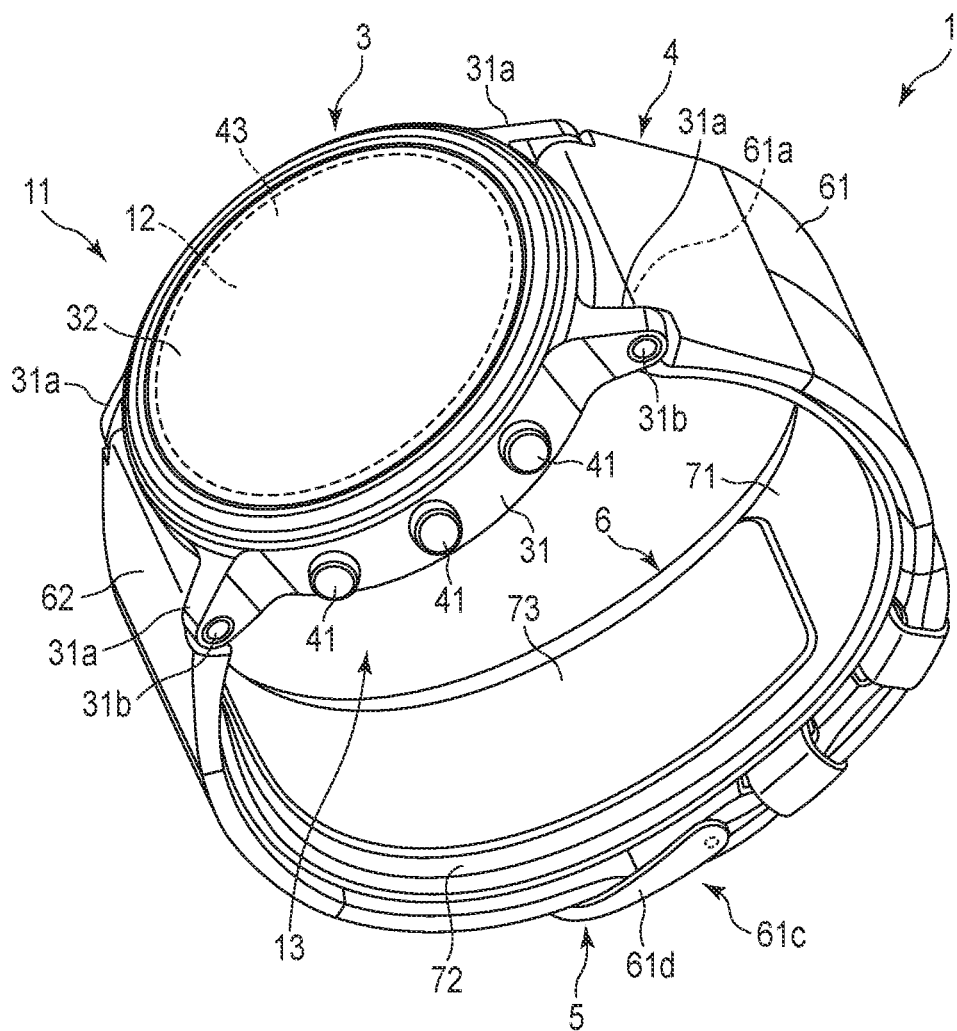
FIG. 1 is a perspective view of a configuration of a blood pressure measuring device according to a first embodiment of the present invention.
Figure 2:
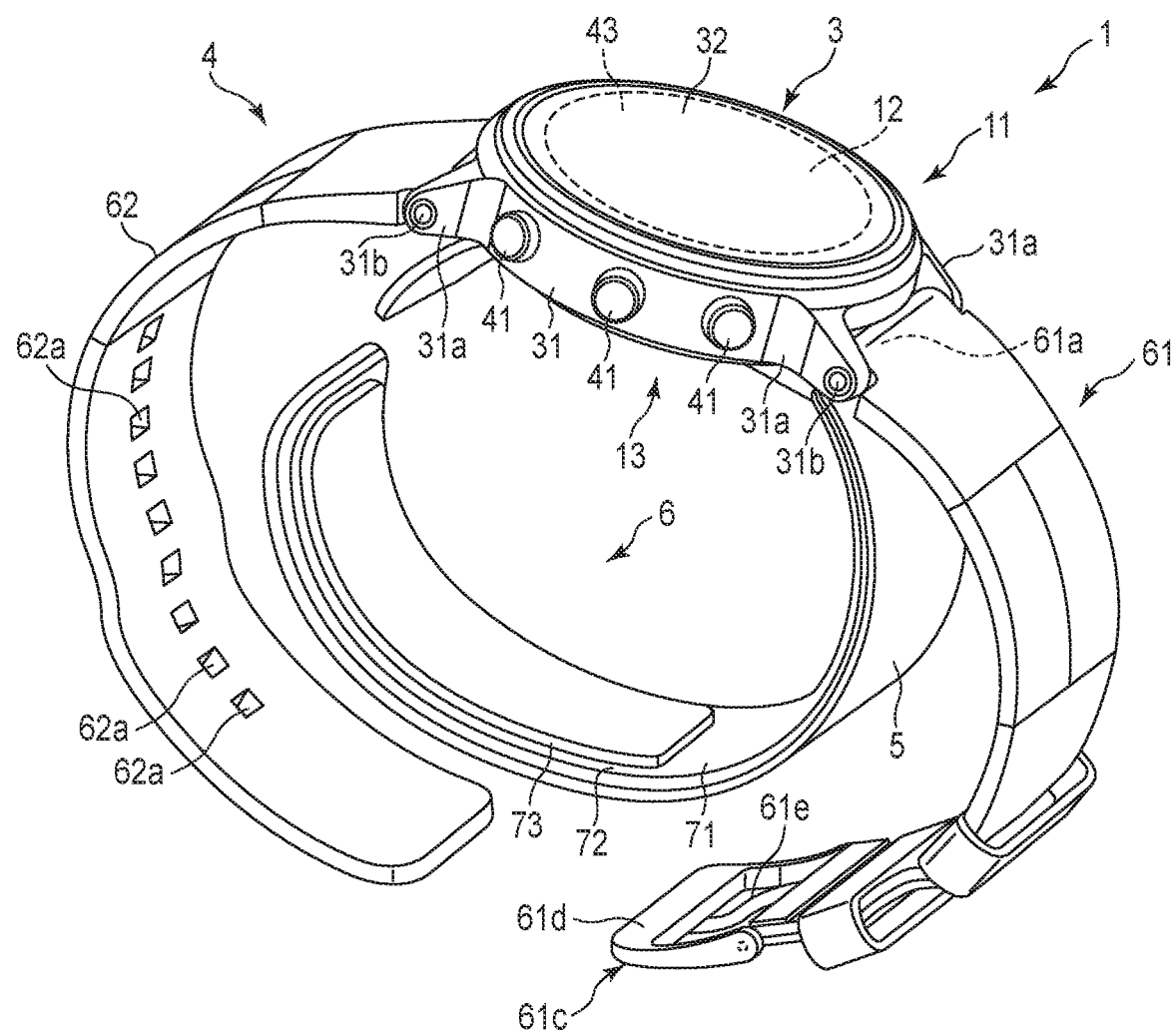
FIG. 2 is a perspective view of a configuration of the blood pressure measuring device.
Figure 3:
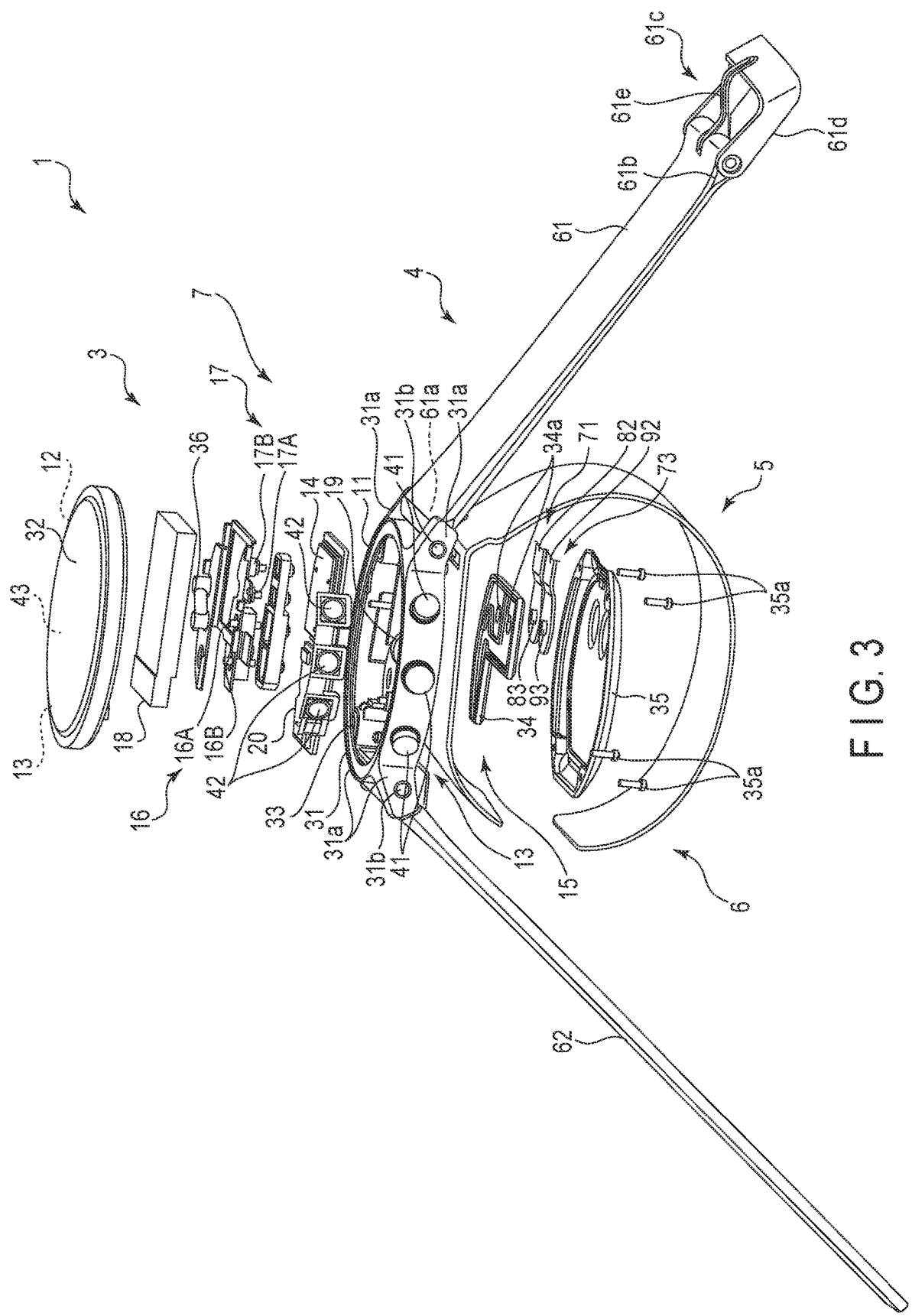
FIG. 3 is an exploded view of a configuration of the blood pressure measuring device.
Figure 4:
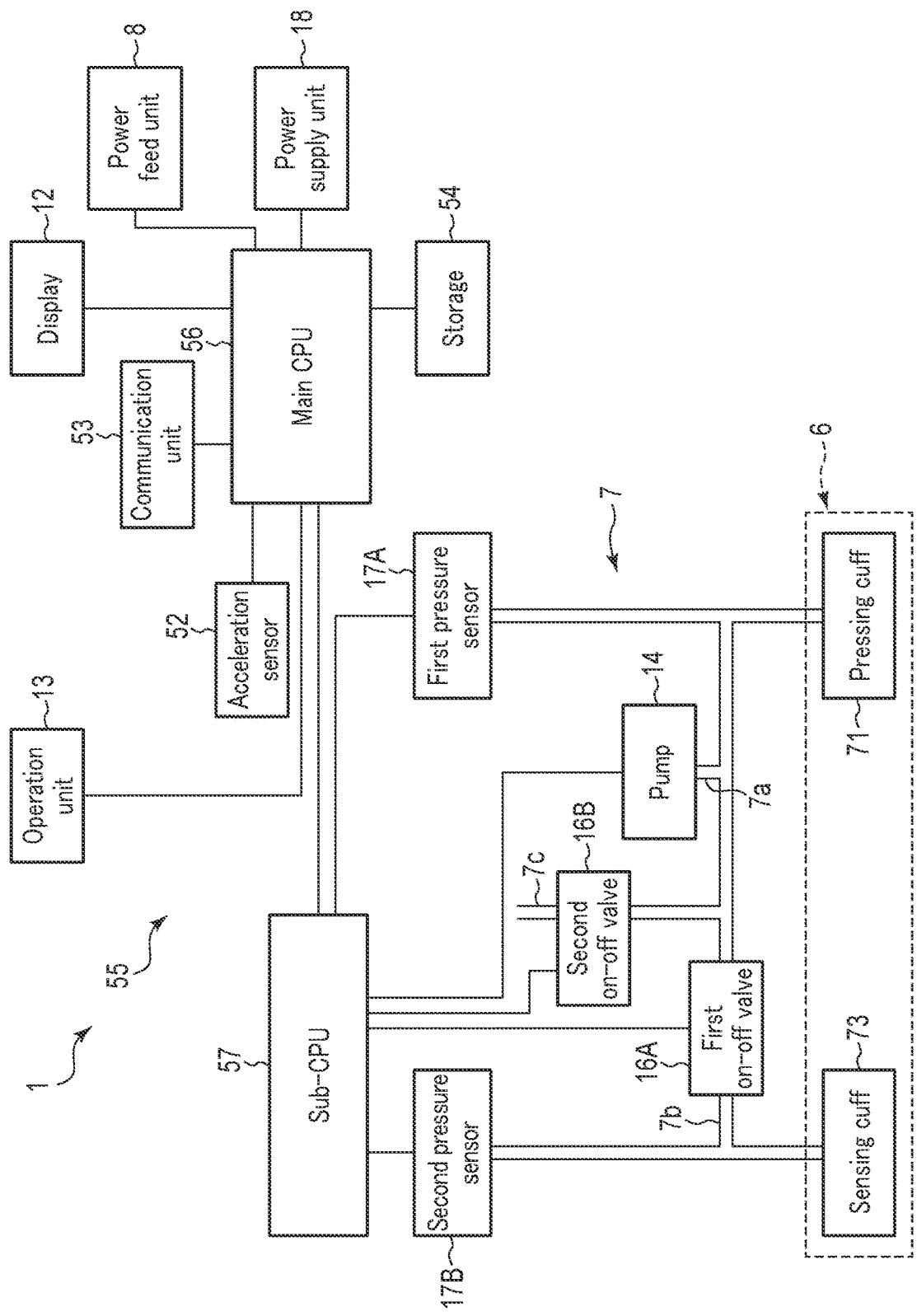
FIG. 4 is a block diagram showing a configuration of the blood pressure measuring device.
Figure 5:
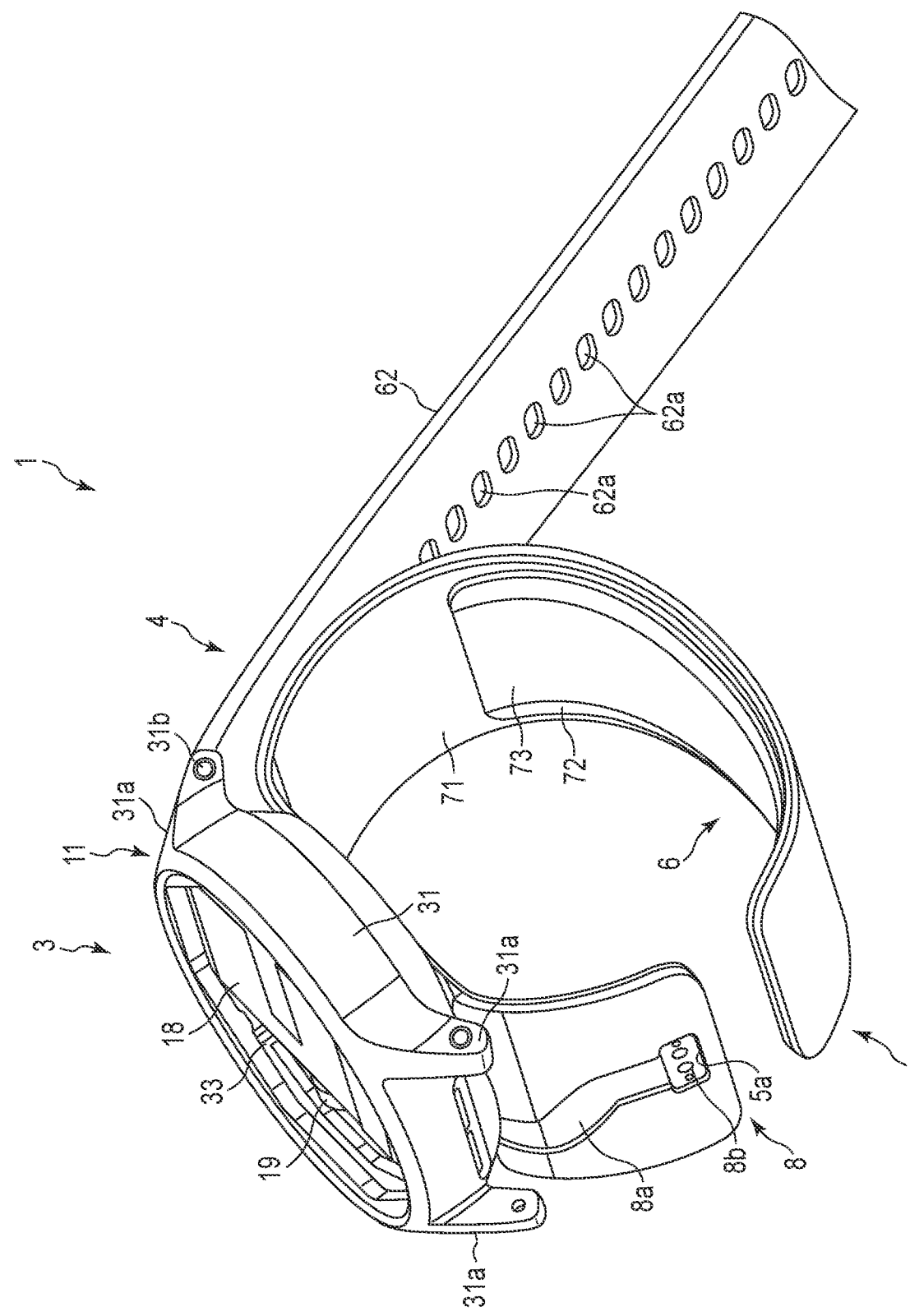
FIG. 5 is a perspective diagram showing a configuration of the blood pressure measuring device, with a part thereof omitted.

FIG. 1 is a perspective view of a configuration of the blood pressure measuring device 1 according to a first embodiment of the present invention with a strap 4 closed. FIG. 2 is a perspective view of a configuration of the blood pressure measuring device 1 with the strap 4 opened. FIG. 3 is an exploded perspective view of a configuration of the blood pressure measuring device 1. FIG. 4 is a block diagram showing a configuration of the blood pressure measuring device 1. FIG. 5 is a perspective view of the blood pressure measuring device 1, in which a windshield 32, a display 12, and a first strap 61 are omitted.

Figure 6:
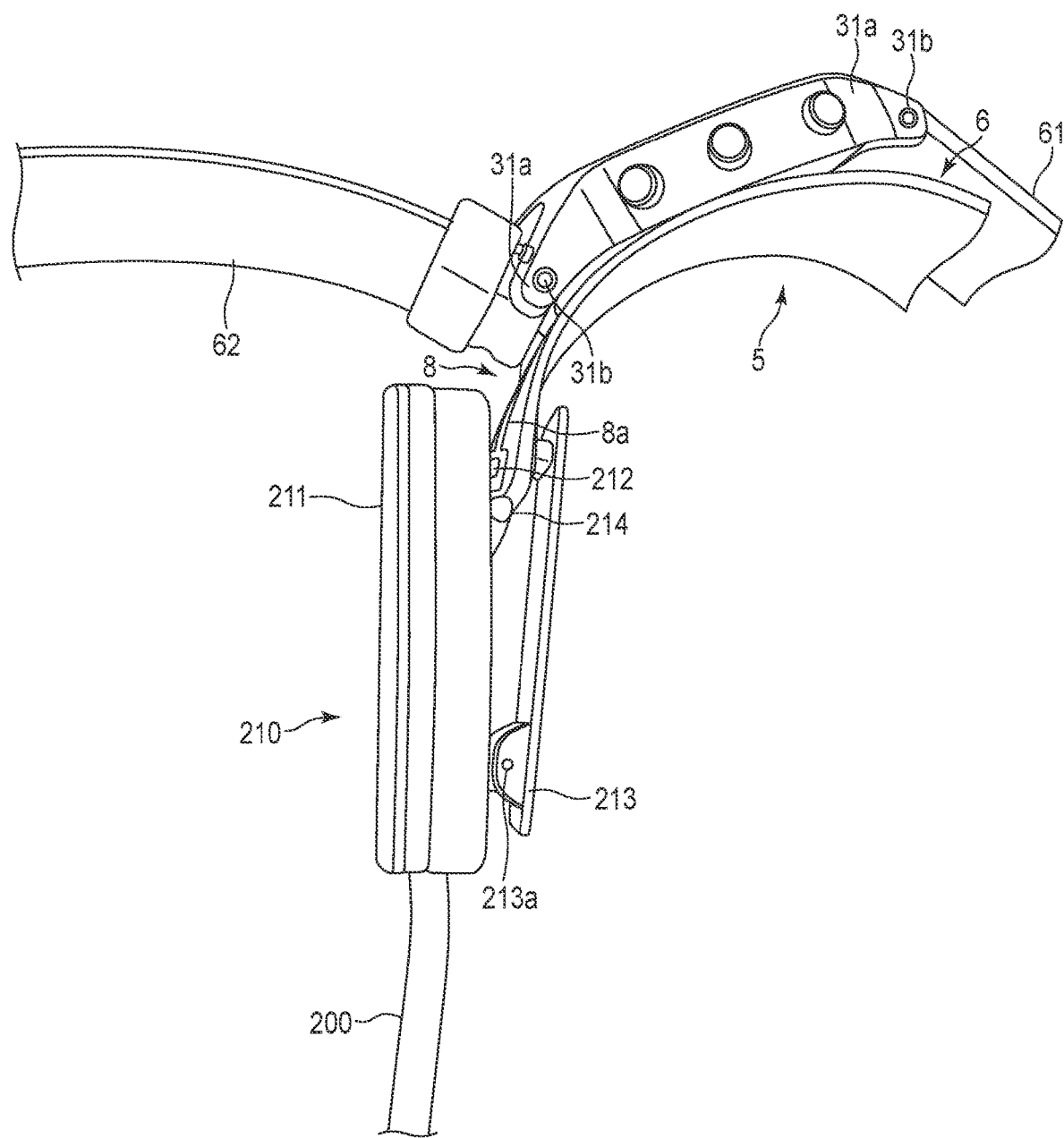
FIG. 6 is a perspective diagram showing a configuration of the blood pressure measuring device, with a part thereof omitted, and showing an example of the use in which a connector is connected to a power feed unit.
Figure 7:
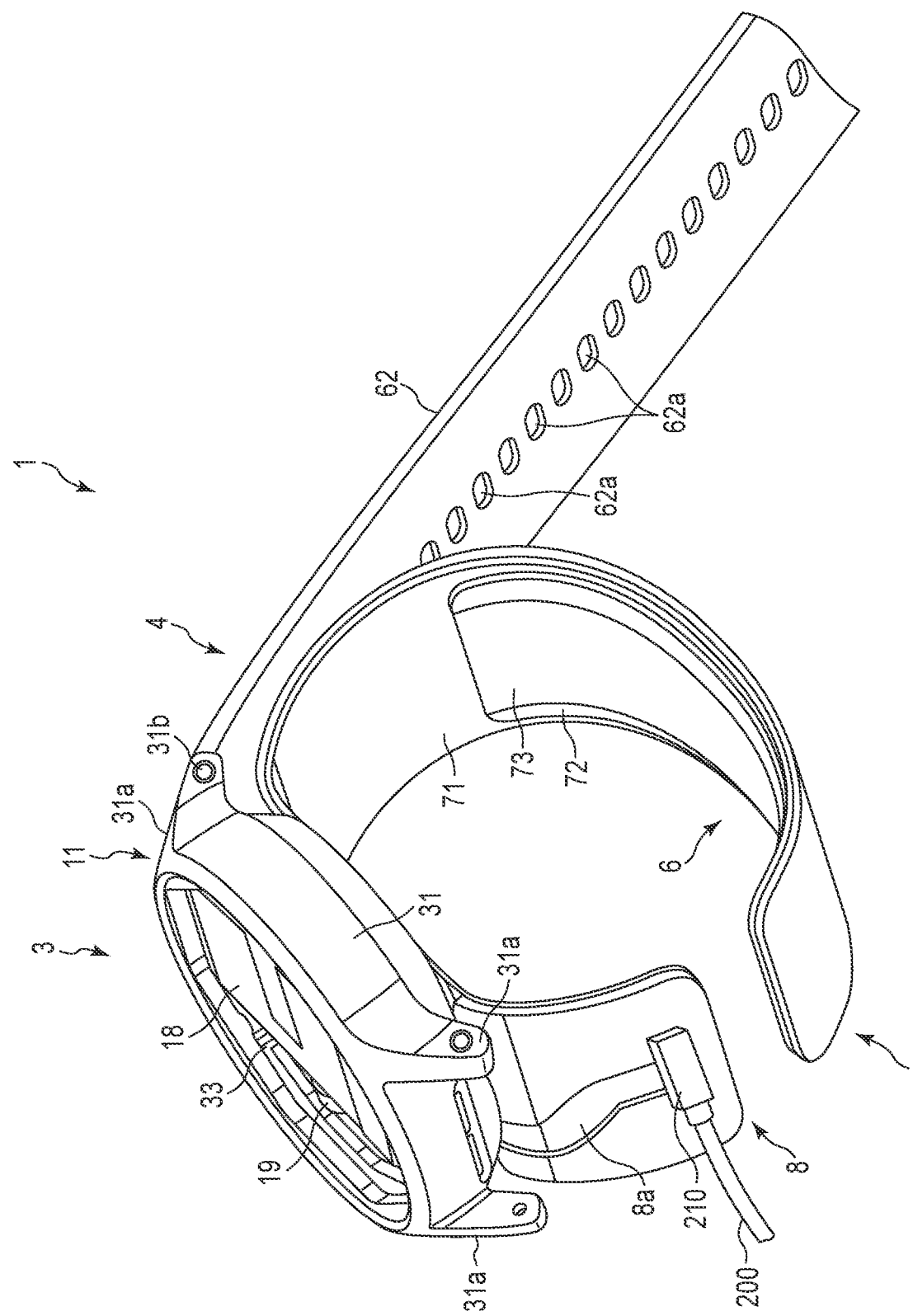
FIG. 7 is a perspective diagram showing a configuration of the blood pressure measuring device, with a part thereof omitted, and showing an example of the use in which a connector of another example is connected to a power feed unit.
Figure 8:
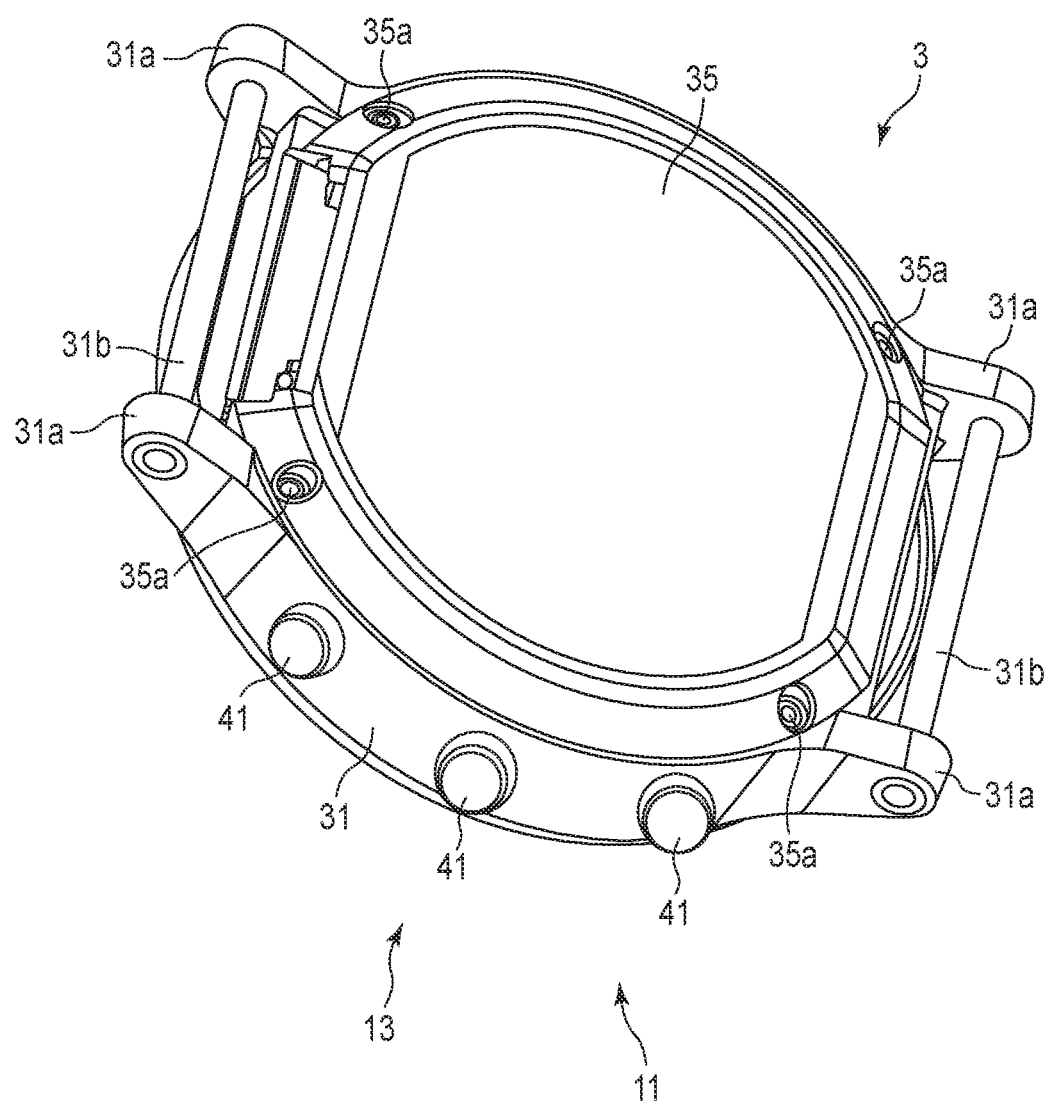
FIG. 8 is a perspective view of a configuration of a device main body of the blood pressure measuring device.
Figure 10:
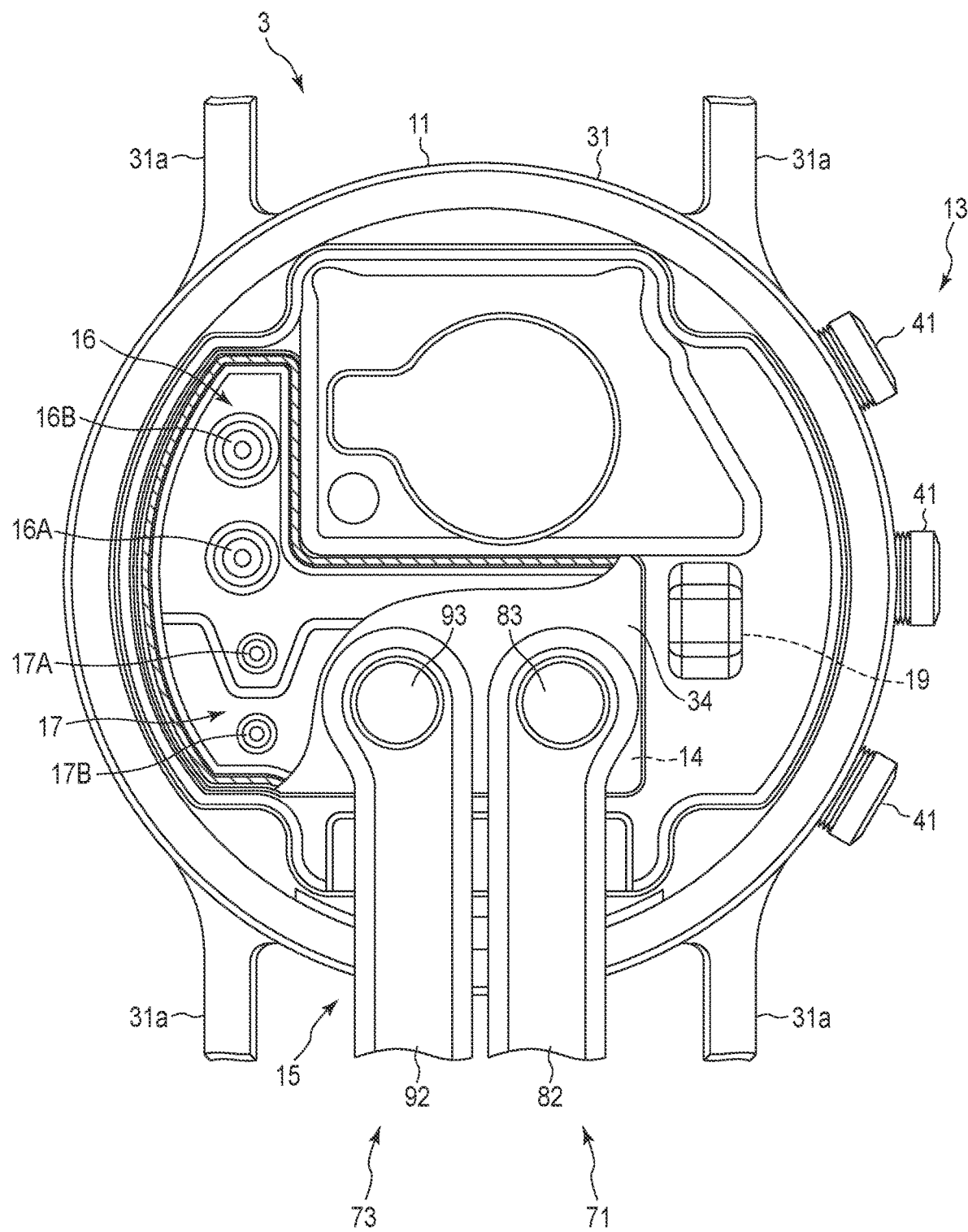
FIG. 10 is a plan view of an internal configuration of the device main body.
Figure 11:
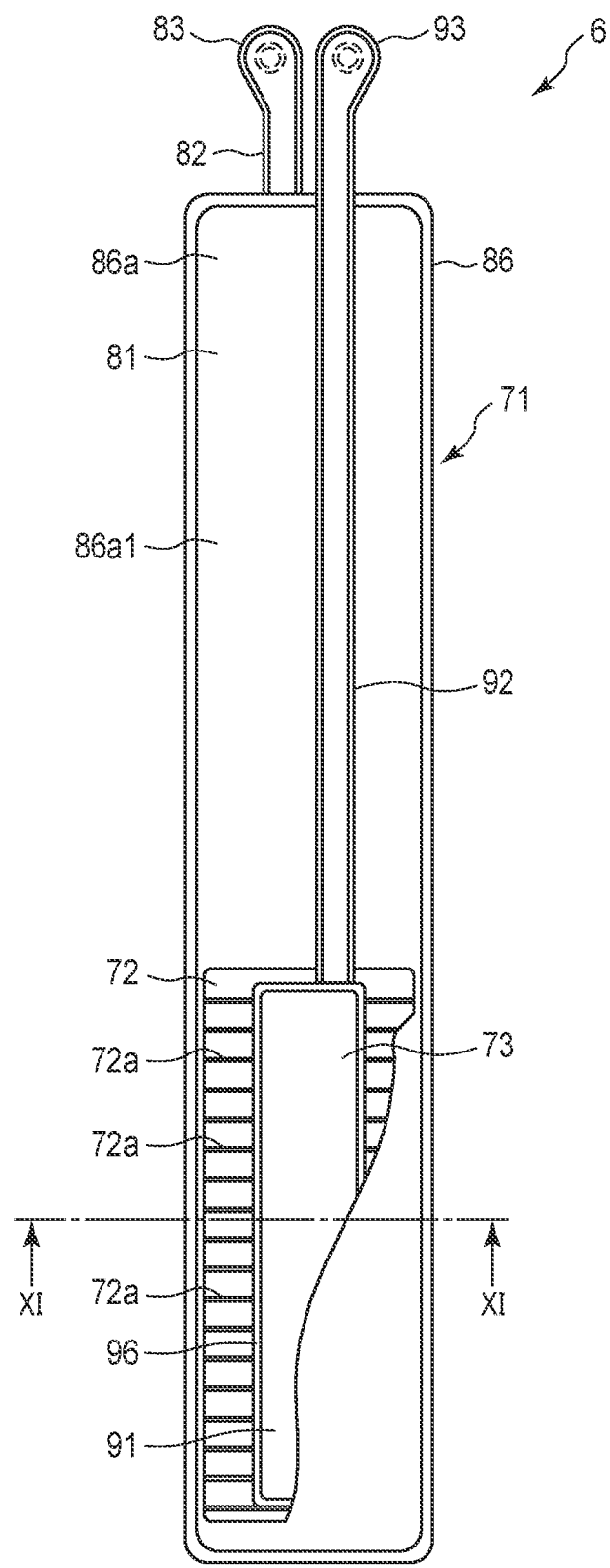
FIG. 11 is a plan view of a configuration of a cuff structure of the blood pressure measuring device.
Figure 12:
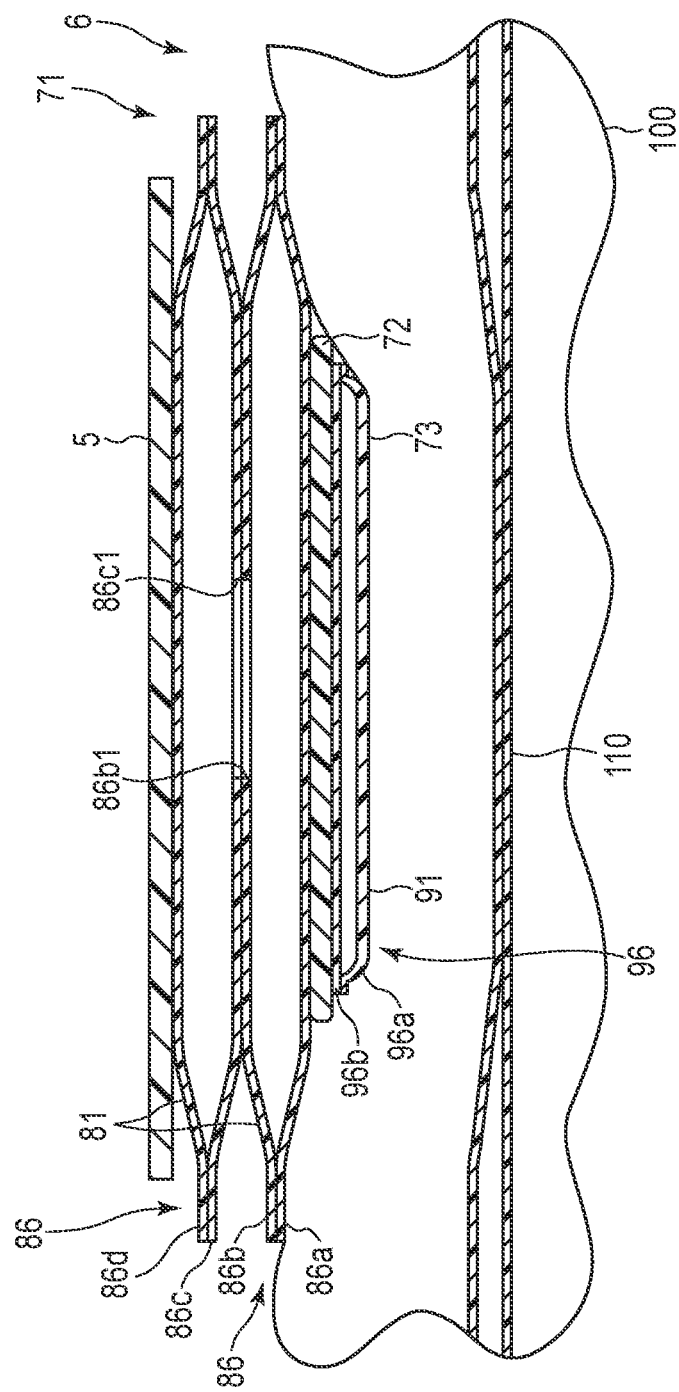
FIG. 12 is a cross-sectional diagram showing configurations of a curler and the cuff structure of the blood pressure measuring device and showing an example of a state in which arteries are compressed.

FIG. 6 is a perspective diagram showing the blood pressure measuring device 1, in which the windshield 32, the display 12, and the strap 4 are partially omitted, and showing an example of the use in which a connector 210 is connected to a power feed unit 8. FIG. 7 is a perspective diagram showing another example of the connector 210. FIG. 8 is a perspective view of a configuration of the device main body 3 of the blood pressure measuring device 1, as viewed from a back cover 35 side. FIGS. 9 and 10 are plan views of an internal configuration of the device main body 3, as viewed from the windshield 32 side and the back cover 35 side, respectively. FIG. 11 is a plan view of a configuration of a cuff structure 6 of the blood pressure measuring device 1, as viewed from a sensing cuff 73 side. FIG. 12 is a cross-sectional diagram schematically showing configurations of the curler 5 and the cuff structure 6 of the blood pressure measuring device 1 taken along line XI-XI in FIG. 11.

The blood pressure measuring device 1 is an electronic blood pressure measuring device that is worn on a living body. In the present embodiment, for example, an electronic blood pressure measuring device in the form of a wearable device worn on a wrist 100 of a living body will be described as the blood pressure measuring device 1. The blood pressure measuring device 1 may be an electronic blood pressure measuring device that is worn on an upper arm. As shown in FIGS. 1 to 13, the blood pressure measuring device 1 includes: the device main body 3; the strap 4; the curler 5; the cuff structure 6 with a pressing cuff 71 and the sensing cuff 73; a fluid circuit 7; and a power feed unit 8.

As shown in FIGS. 1 to 9, the device main body 3 includes a case 11, a display 12, an operation unit 13, a pump 14, a flow passage section 15, an on-off valve 16, pressure sensor 17, a power supply unit 18, a vibration motor 19, and a control substrate 20. The device main body 3 is a supply device that supplies a fluid to the pressing cuff 71 by using the pump 14, the on-off valve 16, the pressure sensor 17, the control substrate 20, and the like.

The case 11 includes an outer case 31; a windshield 32 that covers an upper opening of the outer case 31; a base 33 provided in a lower part of the inside of the outer case 31; a flow passage cover 34 that covers a part of a back surface of the base 33; and a back cover 35 that covers a lower side of the outer case 31. The case 11 also includes a flow passage tube 36 constituting a part of the fluid circuit 7.

The outer case 31 is formed in a cylindrical shape. The outer case 31 includes: pairs of lugs 31a provided at symmetrical positions in the circumferential direction of the outer peripheral surface; and spring rods 31b respectively provided between the paired lugs 31a. The windshield 32 is a circular glass plate.

The base 33 holds the display 12, the operation unit 13, the pump 14, the on-off valve 16, the pressure sensor 17, the power supply unit 18, the vibration motor 19, and the control substrate 20. The base 33 forms a part of the flow passage section 15.

The flow passage cover 34 is fixed to a back surface of the base 33, which is an outer surface of the base 33 on the back cover 35 side. A groove is provided in one or both of the base 33 and the flow passage cover 34, thereby forming a part of the flow passage section 15.

The back cover 35 covers an end of the outer case 31 on the living body side. The back cover 35 is fixed to an end of the outer case 31 or the base 33 on the living body side by, for example, four screws 35a or the like.

The flow passage tube 36 forms a part of the flow passage section 15. The flow passage tube 36 connects, for example, the on-off valve 16 and a part of the base 33 constituting the flow passage section 15.

The display 12 is disposed on the base 33 of the outer case 31 and directly below the windshield 32. The display 12 is electrically connected to the control substrate 20. The display 12 is, for example, a liquid crystal display or an organic electroluminescence display. The display 12 displays various kinds of information including date and time, and measurement results of blood pressure values, such as systolic blood pressure and diastolic blood pressure, a heart rate, and the like.

The operation unit 13 is configured to allow a user to input a command. For example, the operation unit 13 includes: a plurality of buttons 41 provided to the case 11; a sensor 42 that detects an operation of the buttons 41; and a touch panel 43 provided to the display 12 or the windshield 32. The operation unit 13 is operated by a user to convert a command into an electric signal. The sensor 42 and the touch panel 43 are electrically connected to the control substrate 20 and output an electric signal to the control substrate 20.

For example, three buttons 41 are provided. The buttons 41 are supported by the base 33 and protrude from the outer peripheral surface of the outer case 31. The plurality of buttons 41 and the plurality of sensors 42 are supported by the base 33. For example, the touch panel 43 is provided integrally to the windshield 32.

The pump 14 is, for example, a piezoelectric pump. The pump 14 compresses the air and supplies the compressed air to the cuff structure 6 via the flow passage section 15. The pump 14 is electrically connected to the controller 55.

The flow passage section 15 is an air flow passage formed of a groove or the like provided in the flow passage cover 34 that covers the back cover 35 side of the base 33 and the main surface of the base 33 on the back cover 35 side. The flow passage section 15 forms a flow passage leading from the pump 14 to the pressing cuff 71, and a flow passage leading from the pump 14 to the sensing cuff 73. The flow passage section 15 also forms a flow passage leading from the pressing cuff 71 to the atmosphere, and a flow passage leading from the sensing cuff 73 to the atmosphere. The flow passage cover 34 includes a connected portion 34a to which the pressing cuff 71 and the sensing cuff 73 are connected. The connected portion 34a is, for example, a cylindrical nozzle provided to the flow passage cover 34.

The on-off valve 16 opens and closes a part of the flow passage section 15. For example, a plurality of on-off valves 16 are provided, and selectively open and close the flow passage leading from the pump 14 to the pressing cuff 71; the flow passage leading from the pump 14 to the sensing cuff 73; the flow passage leading from the pressing cuff 71 to the atmosphere; and the flow passage leading from the sensing cuff 73 to the atmosphere, depending on the combination of the opening and closing of the on-off valves 16. For example, two on-off valves 16 are used.

The pressure sensor 17 detects the pressure of the pressing cuff 71 and the sensing cuff 73. The pressure sensor 17 is electrically connected to the control substrate 20. The pressure sensor 17 is electrically connected to the control substrate 20, converts the detected pressure into an electric signal, and outputs the electric signal to the control substrate 20. For example, the pressure sensor 17 is provided in the flow passage leading from the pump 14 to the pressing cuff 71, and the flow passage leading from the pump 14 to the sensing cuff 73. Since these flow passages are continuous with the pressing cuff 71 and the sensing cuff 73, the pressures in these flow passages become the pressures in the internal spaces of the pressing cuff 71 and the sensing cuff 73.

The power supply unit 18 is, for example, a secondary battery such as a lithium ion battery. The power supply unit 18 is electrically connected to the control substrate 20. The power supply unit 18 supplies power to the control substrate 20.

As shown in FIGS. 4 and 6, the control substrate 20 includes, for example, a substrate 51, an acceleration sensor 52, a communication unit 53, a storage 54, and a controller 55. The control substrate 20 is configured by mounting the acceleration sensor 52, the communication unit 53, the storage 54, and the controller 55 on the substrate 51.

The substrate 51 is fixed to the base 33 of the case 11 by a screw or the like.

The acceleration sensor 52 is, for example, a three-axis acceleration sensor. The acceleration sensor 52 outputs, to the controller 55, acceleration signals representing accelerations of the device main body 3 in three directions that are orthogonal to one another. For example, the acceleration sensor 52 is used to measure the amount of activity of the living body wearing the blood pressure measuring device 1 based on the detected accelerations.

The communication unit 53 is configured to be able to transmit and receive information to and from an external device in a wireless or wired manner. For example, the communication unit 53 transmits information controlled by the controller 55 and information such as measured blood pressure values, pulse, and the like to an external device via a network, and receives a program for software update, etc., from the external device via the network to transmit the program, etc., to the controller.

In the present embodiment, the network is, for example, the Internet, but is not limited thereto. The network may be a network such as a local area network (LAN) provided in a hospital, or direct communication with an external device using, for example, a cable having a terminal of a predetermined standard such as a USB may be adopted. Therefore, the communication unit 53 may include a plurality of wireless antennas, micro USB connectors, and the like.

The storage 54 stores in advance program data for controlling the entire blood pressure measuring device 1 and the fluid circuit 7, setting data for the setting of various functions of the blood pressure measuring device 1, calculation data for the calculation of blood pressure values and a pulse from a pressure measured by the pressure sensor 17, and the like. The storage 54 also stores information such as measured blood pressure values and pulse.

The controller 55 is formed of one or more CPUs, and controls the operation of the entire blood pressure measuring device 1 and the operation of the fluid circuit 7. The controller 55 is electrically connected to the display 12, the operation unit 13, the pump 14, the on-off valves 16, and the pressure sensors 17, and supplies electric power. The controller 55 is electrically connected to the power feed unit 8. The controller 55 charges the power supply unit 18 with the power supplied from the power feed unit 8.

Also, the controller 55 controls the operations of the display 12, the pump 14, and the on-off valves 16 based on the electric signals output from the operation unit 13 and the pressure sensor 17.

For example, the controller 55 includes a main CPU 56 that controls the operation of the entire blood pressure measuring device 1 and a sub-CPU 57 that controls the operation of the fluid circuit 7, as shown in FIG. 4. For example, when a command to measure blood pressure is input from the operation unit 13, the sub-CPU 57 drives the pump 14 and the on-off valves 16 to send compressed air to the pressing cuff 71 and the sensing cuff 73. For example, the main CPU 56 detects an amount of power that can be discharged by the power supply unit 18 and controls the amount of charge.

The sub-CPU 57 also controls the driving and stoppage of the pump 14 and the opening and closing of the on-off valves 16 based on the electric signal output from the pressure sensor 17, selectively sends compressed air to the pressing cuff 71 and the sensing cuff 73, and selectively depressurizes the pressing cuff 71 and the sensing cuff 73. The main CPU 56 obtains measurement results of blood pressure values, such as systolic blood pressure and diastolic blood pressure, a heart rate, and the like from the electric signal output from the pressure sensor 17, and outputs an image signal corresponding to the measurement results to the display 12.

As shown in FIGS. 1 to 3, the strap 4 includes a first strap 61 provided to one of the pairs of lugs 31a and the spring rod 31b, and a second strap 62 provided to the other pair of lugs 31a and the spring rod 31b. The width of the strap 4 is larger than the width of the curler 5 in the longitudinal direction, and the strap 4 covers the curler 5.

The first strap 61 is a so-called "parent" and is formed in a band shape. The first strap 61 includes a first hole 61a provided at one end and perpendicular to the longitudinal direction of the first strap 61, a second hole 61b provided at the other end and perpendicular to the longitudinal direction of the first strap 61, and a buckle 61c provided in the second hole 61b. The first hole 61a has an inner diameter so that the spring rod 31b can be inserted thereinto and the first strap 61 can rotate with respect to the spring rod 31b. That is, the first hole 61a is disposed between the paired lugs 31a and at the spring rod 31b, so that the first strap 61 is rotatably held by the outer case 31.

The second hole 61b is provided at a distal end of the first strap 61.

The buckle 61c includes a rectangular frame-shaped body 61d and a prodding stick 61e rotatably attached to the frame-shaped body 61d. One side of the frame-shaped body 61d to which the prodding stick 61e is attached is inserted into the second hole 61b, so that the frame-shaped body 61d is rotatably attached with respect to the first strap 61.

The second strap 62 is a so-called "pointed end", and formed in a band shape having a width that allows the second strap 62 to be inserted into the frame-shaped body 61d. The second strap 62 includes a plurality of small holes 62a into which the prodding stick 61e is inserted.

The strap 4 described above forms an annular shape along the circumferential direction of the wrist 100 together with the outer case 31 as the second strap 62 is inserted into the frame-shaped body 61d and the prodding stick 61e is inserted into the small hole 62a, thereby integrally connecting the first strap 61 and the second strap 62 to each other.

The curler 5 is made of a resin material. The curler 5 is formed in a band shape bent along the circumferential direction of the wrist. As a specific example, the curler 5 has a band shape bent along the circumferential direction of the wrist, and one end and the other end thereof are adjacent to each other and are separated from each other with a predetermined gap therebetween. An outer surface of the curler 5 on one end side is fixed to, for example, the back cover 35 of the device main body 3. Also, one end side of the curler 5 protrudes from the device main body 3.

The power feed unit 8 is provided on a bent outer surface or inner surface of the curler 5. As a specific example, the curler 5 has a recess 5a on an outer surface on one end side, and the power feed unit 8 is provided in the recess 5a. The recess 5a is formed from the lower side of the back cover 35 toward one end. The recess 5a is configured to have a depth at which the provided power feed unit 8 does not protrude from the outer surface of the curler 5, in other words, a depth at which the power feed unit 8 is positioned on a side closer to the inner surface with respect to the outer surface of the curler 5.

As a specific example, the curler 5 has a shape bent along the circumferential direction of the wrist 100, for example, in a side view from a direction perpendicular to the circumferential direction of the wrist, in other words, the longitudinal direction of the wrist, as shown in FIGS. 1 to 6 and FIG. 13. For example, the curler 5 extends from the device main body 3 to the palmar side of the wrist 100 through the dorsal side of the wrist 100 and one side of the wrist 100, and extends to the other side of the wrist 100. That is, the curler 5 bends along the circumferential direction of the wrist and thereby extends over most parts of the wrist 100 in the circumferential direction of the wrist 100, and both ends of the curler 5 are separated from each other with a predetermined space therebetween. Also, one end of the curler 5 protrudes from the device main body 3, and the power feed unit 8 is provided on the outer surface on the one end side.

The curler 5 has a hardness encompassing both flexibility and shape-retaining capability. The "flexibility" means that the curler 5 deforms in the radial direction when an external force is applied to the curler 5, and means that when the curler 5 is pressed by the strap 4, for example, the curler 5 deforms so as to approach the wrist, conform to the shape of the wrist, or trace the shape of the wrist, as viewed from a side of the curler 5. The "shape-retaining capability" means that the curler 5 can maintain a pre-formed shape when no external force is applied thereto; and in the present embodiment, it means that the curler 5 can maintain a shape bent along the circumferential direction of the wrist. The curler 5 is made of a resin material. For example, the curler 5 is made of polypropylene and has a thickness of about 1 mm. The curler 5 holds the cuff structure 6 along the inner surface shape of the curler 5.

As shown in FIGS. 1 to 6 and 11 to 13, the cuff structure 6 includes the pressing cuff 71, the back plate 72, and the sensing cuff 73. The cuff structure 6 is configured so that the pressing cuff 71, the back plate 72, and the sensing cuff 73 are stacked and integrally formed. The cuff structure 6 is fixed to the inner surface of the curler 5.

The pressing cuff 71 is an example of the cuff. The pressing cuff 71 is fluidly connected to the pump 14 via the flow passage section 15. The pressing cuff 71 is inflated to press the back plate 72 and the sensing cuff 73 toward the living body. The pressing cuff 71 includes a plurality of air bags 81, a tube 82 communicating with the air bags 81, and a Connector 83 provided at a distal end of the tube 82.

The air bag 81 is a bag-shaped structure. Since the blood pressure measuring device 1 is configured to use the air with the pump 14 in the present embodiment, an air bag will be described. However, when a fluid other than the air is used, the bag-shaped structure may be a fluid bag such as a liquid bag.

The plurality of air bags 81 are stacked and fluidly communicate with each other in the stacking direction. As a specific example, the pressing cuff 71 includes two layers of air bags 81 fluidly communicating with each other in the stacking direction, a tube 82 provided at one end of one of the air bags 81 in the longitudinal direction, and a Connector 83 provided at a distal end of the tube 82.

The pressing cuff 71 is configured so that a main surface of one of the air bags 81 is fixed to the inner surface of the curler 5. For example, the pressing cuff 71 is attached to the inner surface of the curler 5 by a double-sided tape or an adhesive.

The two layers of air bags 81 are formed in a rectangular shape elongated in one direction. The air bag 81 is formed by, for example, combining two sheet members 86 elongated in one direction and welding the edges thereof by heat. As a specific example, the two layers of air bags 81 include, from the living body side: a first sheet member 86a; a second sheet member 86b forming the first layer of air bag 81 with the first sheet member 86a; a third sheet member 86c integrally bonded to the second sheet member 86b; and a fourth sheet member 86d forming the second layer of air bag 81 with the third sheet member 86c, as shown in FIGS. 10 to 12.

The first sheet member 86a and the second sheet member 86b form the air bag 81 by the welding of the peripheral edges of the four sides of the sheet members. The second sheet member 86b and the third sheet member 86c are disposed to face each other, and each include a plurality of openings 86b1 and 86c1 that fluidly connect the two air bags 81. The fourth sheet member 86d has an adhesive layer or a double-sided tape on the outer surface thereof on the curler 5 side, and is attached to the curler 5 by the adhesive layer or the double-sided tape.

The third sheet member 86c and the fourth sheet member 86d form the air bag 81 by the welding of the peripheral edges of the four sides of the sheet members. Also, for example, the tube 82 fluidly continuous with the internal space of the air bag 81 is disposed on one side of the third sheet member 86c and the fourth sheet member 86d, and is fixed by welding. For example, the third sheet member 86c and the fourth sheet member 86d form the air bag 81 by the welding of the peripheral edges of the four sides of the sheet members with the tube 82 disposed between the third sheet member 86c and the fourth sheet member 86d, thereby integrally welding the tube 82 thereto.

The tube 82 is connected to one of the two layers of air bags 81, and is provided at one end in the longitudinal direction of the air bag 101. As a specific example, the tube 82 is provided at an end on the curler 5 side of the two layers of air bags 81 and close to the device main body 3. The tube 82 has the Connector 83 at its distal end. The tube 82 forms a flow passage between the device main body 3 and the air bag 81 in the fluid circuit 7. The Connector 83 is connected to the connected portion 34a of the flow passage cover 34. The Connector 83 is, for example, a nipple.

The back plate 72 is attached to an outer surface 86a1 of the first sheet member 86a of the pressing cuff 71 by an adhesive layer, a double-sided tape, or the like. The back plate 72 is made of a resin material and formed in a plate shape. For example, the back plate 72 is made of polypropylene and formed in a plate shape having a thickness of about 1 mm. The back plate 72 has shape traceability.

The "shape traceability" refers to a function that allows the back plate 72 to deform so as to trace the shape of a contacted portion of the wrist 100 to be placed; the "contacted portion of the wrist 100" refers to a region that comes into contact with the back plate 72; and the "contact" includes both direct and indirect contact.

Therefore, the shape traceability is a function of deforming the back plate 72 provided to the pressing cuff 71 or the back plate 72 provided between the pressing cuff 71 and the sensing cuff 73 to such an extent that the back plate 72 itself or the sensing cuff 73 provided to the back plate 72 conforms to the wrist 100 or comes into close contact with the wrist 100 along the wrist 100.

For example, the back plate 72 includes a plurality of grooves 72a on both main surfaces of the back plate 72 at positions facing each other and at equal distances in the longitudinal direction of the back plate 72. As a result, the portion of the back plate 72 having the grooves 72a is thinner than the portion of the back plate 72 without the grooves 72a, and is thus easily deformed. Accordingly, the back plate 72 has shape traceability of deforming in accordance with the shape of the wrist 100. The back plate 72 is formed to have a length covering the palmar side of the wrist 100. The back plate 72 transmits the pressing force from the pressing cuff 71 to the main surface of the sensing cuff 73 on the back plate 72 side, in a state of conforming to the shape of the wrist 100.

Figure 13:
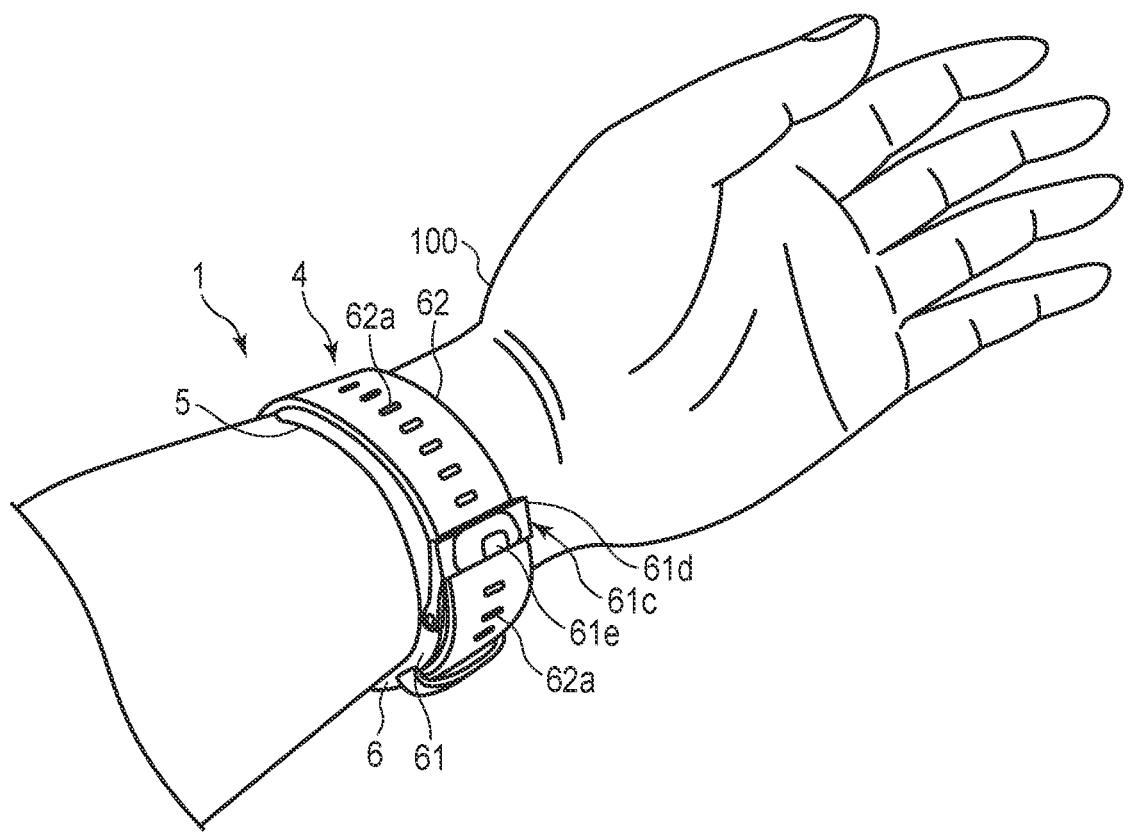
FIG. 13 is a perspective diagram showing an example in which the blood pressure measuring device is worn on a wrist.

The sensing cuff 73 is fixed to the main surface of the back plate 72 on the living body side. As shown in FIG. 13, the sensing cuff 73 directly contacts the region of the wrist 100 where arteries exist. The sensing cuff 73 is formed in the same shape as that of the back plate 72 or in a shape smaller than that of the back plate 72, in the longitudinal direction and the width direction of the back plate 72. The sensing cuff 73 is inflated to compress the region of the wrist 100 on the palmar side where arteries 110 exist. The sensing cuff 73 is pressed toward the living body by the inflated pressing cuff 71 via the back plate 72. As a specific example, the sensing cuff 73 includes one air bag 91, a tube 92 communicating with the air bag 91, and a Connector 93 provided at a distal end of the tube 92. The sensing cuff 73 is configured so that one of the main surfaces of the air bag 91 is fixed to the back plate 72. For example, the sensing cuff 73 is attached to the main surface of the back plate 72 on the living body side by a double-sided tape, an adhesive layer, or the like.

The air bag 91 is a bag-shaped structure. Since the blood pressure measuring device 1 is configured to use the air with the pump 14 in the present embodiment, an air bag will be described. However, when a fluid other than the air is used, the bag-shaped structure may be a liquid bag or the like. A plurality of air bags 91 described above are stacked and fluidly communicate with each other in the stacking direction.

The air bag 91 is formed in a rectangular shape elongated in one direction. The air bag 91 is formed by, for example, combining two sheet members elongated in one direction and the welding of the edges thereof by heat. As a specific example, the air bag 91 includes a fifth sheet member 96a and a sixth sheet member 96b from the living body side, as shown in FIGS. 10 and 11.

For example, the fifth sheet member 96a and the sixth sheet member 96b are configured so that the tube 92 fluidly continuous with the internal space of the air bag 91 is disposed on one side of the fifth sheet member 96a and the sixth sheet member 96b, and is fixed by welding. For example, the fifth sheet member 96a and the sixth sheet member 96b form the air bag 91 by the welding of the peripheral edges of the four sides of the sheet members with the tube 92 disposed between the fifth sheet member 96a and the sixth sheet member 96b, thereby integrally welding the tube 92 thereto.

The tube 92 is provided at one end in the longitudinal direction of the air bag 91. As a specific example, the tube 92 is provided at an end of the air bag 91 close to the device main body 3. The tube 92 has the Connector 93 at its distal end. The tube 92 forms a flow passage between the device main body 3 and the air bag 91 in the fluid circuit 7. The Connector 93 is connected to the connected portion 34a of the flow passage cover 34. The Connector 93 is, for example, a nipple.

The sheet members 86 and 96 forming the pressing cuff 71 and the sensing cuff 73 are made of a thermoplastic elastomer. For example, thermoplastic polyurethane resin (hereinafter referred to as "TPU"), vinyl chloride resin, ethylene-vinyl acetate resin, thermoplastic polystyrene resin, thermoplastic polyolefin resin, thermoplastic polyester resin, and thermoplastic polyamide resin may be used as the thermoplastic elastomer forming the sheet members 86 and 96. TPU is preferably used as the thermoplastic elastomer. The sheet member may have a single-layer structure or a multi-layer structure.

The sheet members 86 and 96 are not limited to the thermoplastic elastomer, and may be a thermosetting elastomer such as silicone or a combination of a thermoplastic elastomer (for example, TPU) and a thermosetting elastomer (for example, silicone).

When a thermoplastic elastomer is used for the sheet members 86 and 96, a molding method such as T-die extrusion molding or injection molding is adopted, and when a thermosetting elastomer is used for the sheet members 86 and 96, a molding method such as mold casting molding is adopted. The sheet members are molded by the molding method and thereafter sized into a predetermined shape. Then, the sized pieces are bonded by adhesion, welding, or the like to form the air bags 81 and 91. As a bonding method, a high-frequency welder or laser welding is used when a thermoplastic elastomer is used, and a molecular adhesive is used when a thermosetting elastomer is used.

The fluid circuit 7 is formed of the case 11, the pump 14, the flow passage section 15, the on-off valve 16, the pressure sensor 17, the pressing cuff 71, and the sensing cuff 73. Hereinafter, a specific example of the fluid circuit 7 will be described in which the two on-off valves 16 used in the fluid circuit 7 are referred to as a "first on-off valve 16A" and a "second on-off valve 16B", and the two pressure sensors 17 used in the fluid circuit 7 are referred to as a "first pressure sensor 17A" and a "second pressure sensor 17B".

As shown in FIG. 4, the fluid circuit 7 includes, for example, a first flow passage 7a which continues from the pump 14 to the pressing cuff 71, a second flow passage 7b which is formed by branching a middle portion of the first flow passage 7a and continues from the pump 14 to the sensing cuff 73, and a third flow passage 7c which connects the first flow passage 7a and the atmosphere. The first flow passage 7a includes the first pressure sensor 17A. The first on-off valve 16A is provided between the first flow passage 7a and the second flow passage 7b. The second flow passage 7b includes the second pressure sensor 17B. The second on-off valve 16B is provided between the first flow passage 7a and the third flow passage 7c.

In the fluid circuit 7 described above, when the first on-off valve 16A and the second on-off valve 16B are closed, only the first flow passage 7a is connected to the pump 14, and the pump 14 and the pressing cuff 71 are fluidly connected. In the fluid circuit 7, when the first on-off valve 16A is opened and the second on-off valve 16B is closed, the first flow passage 7a and the second flow passage 7b are connected, and the pump 14 and the pressing cuff 71, and the pump 14 and the sensing cuff 73 are fluidly connected. In the fluid circuit 7, when the first on-off valve 16A is closed and the second on-off valve 16B is closed, the first flow passage 7a and the third flow passage 7c are connected, and the pressing cuff 71 and the atmosphere are fluidly connected. In the fluid circuit 7, when the first on-off valve 16A and the second on-off valve 16B are opened, the first flow passage 7a, the second flow passage 7b, and the third flow passage 7c are connected, and the pressing cuff 71, the sensing cuff 73, and the atmosphere are fluidly connected.

As shown in FIG. 5, the power feed unit 8 is provided integrally with the curler 5, in the recess 5a provided on an outer surface on one end side of the curler 5 protruding from the device main body 3. For example, the power feed unit 8 is inserted when the curler 5 is molded. As shown in FIG. 6, the power feed unit 8 is configured to be connectable to the connector 210 provided at a distal end of a charging cable 200 of a charger, and to be capable of fixing the connector 210.

The power feed unit 8 includes a wiring unit 8a and a power feed terminal 8b. The wiring unit 8a has one end connected to the power feed terminal 8b and the other end connected to the controller 55. The power feed terminal 8b is formed in, for example, a circular shape, and two power feed terminals 8b are provided.

The connector 210 includes, for example, a main body 211 formed in a rectangular plate shape, a connection terminal 212 provided on one main surface of the main body 211 and connected to the power feed terminal 8b, a plate-shaped clip unit 213 provided on one main surface of the main body 211 and sandwiching the curler 5, and a guide 214 guiding the curler 5 to a power feed position.

The main body 211 covers an end of the charging cable 200 and holds the connection terminal 212 connected to the charging cable 200. The guide 214 is integrally formed with the main body 211, and the clip unit 213 is rotatably attached to the main body 211. The connection terminal 212 is provided in the same number as the power feed terminal 8b and is electrically connected to the power feed terminal 8b. The connection terminal 212 is electrically connected to the charging cable 200 in the main body 211.

The clip unit 213 is a fixing unit for fixing the main body 211 to the curler 5 disposed at the power feed position by the guide 214. The clip unit 213 has a rotary shaft 213a that includes a spring or the like, so that the front end thereof is always biased to one main surface of the connector 210 and can be separated from the one main surface of the connector 210 by pressing the rear end thereof. The guide 214 is, for example, a protrusion provided on the main surface of the connector 210 and abutting the distal end of the curler 5. The guide 214 guides the curler 5 to the power feed position by abutting the curler 5 at a position where the power feed terminal 8b faces the connection terminal 212.

In the example shown above, the connector 210 uses the clip 213 as a fixing unit; however, the connector 210 may be fixed to the power feed unit 8 by providing a permanent magnet to one of the power feed unit 8 or the connector 210, and providing a magnetic body to the other of the power feed unit 8 or the connector 210, as shown in FIG. 7. That is, the fixing unit may be any unit as long as it can fix the main body 211 to the curler 5 in a state where the connector 210 is electrically connected to the power feed unit 8. When a permanent magnet and a magnetic body are used as the fixing unit, the fixing unit also has the function of the guide 214 by making the sizes of the permanent magnet and the magnetic body the same.

According to the blood pressure measuring device 1 configured as described above, the strap 4 is configured so that the first strap 61 and the second strap 62 are rotatably held by the paired lugs 31a and the spring rod 31b of the outer case 31, and the curler 5 is fixed to the back cover 35 of the device main body 3. Therefore, when the blood pressure measuring device 1 is not worn on the wrist 100, that is, when the strap 4 is open, the first strap 61 and the second strap 62 can be separated from the curler 5, allowing the connector 210 of the charging cable 200 to be connected to the power feed unit 8, as shown in FIG. 6, to perform charging.

When the blood pressure measuring device 1 is worn on the wrist 100, the strap 4 covers the curler 5, so that the power feed unit 8 is covered with the strap 4, as shown in FIG. 13. That is, the power feed unit 8 is not exposed to the outside and is protected by the strap 4. Therefore, the blood pressure measuring device 1 can prevent the power feed unit 8 from being contaminated or damaged while being worn by the user. An instance of contact between the strap 4 and the power feed unit 8 can be prevented by, for example, providing the recess 5a in the curler 5 and disposing the power feed unit 8 in the recess 5a as in the present embodiment. Thus, it is also possible to prevent the power feed unit 8 from being damaged by the strap 4 when the blood pressure measuring device 1 is repeatedly worn.

The distance between the power feed terminal 8b and, for example, the controller 55 of the device main body 3 can be reduced to the greatest extent possible by providing the power feed unit 8 at one end of the curler 5 close to the device main body 3, thus making it possible to suppress the length of the wiring unit 8a.

In the blood pressure measuring device 1 configured as described above, the curler 5 is covered with the strap 4 that can be moved closer to and away from the curler 5, and the power feed unit 8 is provided on the outer surface of the curler 5. With this configuration, the power feed unit 8 is covered with the strap 4 when the blood pressure measuring device 1 is worn on the wrist 100, thus making it possible to prevent the power feed unit 8 from becoming exposed to the outside when the blood pressure measuring device 1 is worn. In the blood pressure measuring device 1, the strap 4 is rotatably attached to the device main body 3, and can thus be separated from the curler 5 during the charging of the blood pressure measuring device 1. When attaching the connector 210 of the charging cable 200 to the power feed terminal 8b, the strap 4 may be separated from the curler 5 to fix the connector 210 to the power feed terminal 8b. Therefore, the blood pressure measuring device 1 demonstrates high usability during charging.

In the blood pressure measuring device 1, the power feed unit 8 is provided in the recess 5a on the outer surface of one end of the curler 5 close to the device main body 3, so that the length of the power feed unit 8 from the device main body 3 can be reduced to the greatest extent possible, and the strap 4 can be prevented from interfering with the curler 5 when the blood pressure measuring device 1 is worn on the wrist 100.

The connector 210 electrically connected to the power feed unit 8 provided to the curler 5 is easily attached to the curler 5 by virtue of the configuration of fixing the main body 211 to the curler 5 using the fixing unit in a state where the connection terminal 212 is connected to the power feed terminal 8b. Therefore, the connector 210 demonstrates high usability. Also, the main body 211 is provided with the guide 214 that abuts the curler 5 so as to guide the curler 5 to the power feed position where the connection terminal 212 faces the power feed terminal 8b. Thus, the connection terminal 212 is easily positioned with respect to the power feed terminal 8b, and high usability is achieved.

As described above, the blood pressure measuring device 1 according to the present embodiment prevents the power feed unit 8 from becoming exposed to the outside when worn on the wrist 100, and demonstrates high usability.

The present invention is not limited to the above-described embodiments. For example, the strap 4 covering one end of the curler 5 may be the first strap 61 or the second strap 62. Also, the curler 5 may be configured so that one end thereof does not protrude from the device main body 3 but is fixed inside the device main body 3. In such a configuration, providing the recess 5a and the power feed unit 8 in a portion of the curler 5 adjacent to the device main body 3 produces the same effects as those of the blood pressure measuring device 1 described above. Furthermore, the power feed unit 8 may be provided at the other end of the curler 5, and the power feed unit 8 may be configured so that the wiring unit 8a is disposed inside the curler 5 and that only the power feed terminal 8b is exposed from the outer surface of the curler 5.

That is, the above-described embodiments are merely examples of the present invention in all respects. It goes without saying that various improvements and modifications can be made without departing from the scope of the present invention. In other words, in the implementation of the present invention, a specific configuration according to the embodiment may be adopted as appropriate.

The present invention is not limited to the above-described embodiments and can be modified in various manners in practice without departing from the gist of the invention. The respective embodiments may be suitably combined to the extent possible, in which case a combined effect will be achieved. Furthermore, the above-described embodiments include various stages of invention, and various inventions can be derived by appropriate combinations of the plurality of disclosed elements.

REFERENCE SIGNS LIST

1. Blood pressure measuring device
3. Device main body
4. Strap
5. Curler
6. Cuff structure
7. Fluid circuit
7a. First flow passage
7b. Second flow passage
7c. Third flow passage
8. Power feed unit
8a. Wiring unit
8b. Power feed terminal
11. Case
12. Display
13. Operation unit
14. Pump
15. Flow passage section
16. On-off valve
16A. First on-off valve
16B. Second on-off valve
17. Pressure sensor
17A. First pressure sensor
17B. Second pressure sensor
18. Power supply unit
19. Vibration motor
20. Control substrate
31. Outer case 31a. Lug
31b. Spring rod
32. Windshield
33. Base
34. Flow passage cover
34a. Connected portion
35. Back cover
35a. Screw
36. Flow passage tube
41. Button
42. Sensor
43. Touch panel
51. Substrate
52. Acceleration sensor
53. Communication unit
54. Storage
55. Controller
61. First strap
61a. First hole
61b. Second hole
61c. Buckle
61d. Frame-shaped body
61e. Stick
62. Second strap
62a. Small hole
71. Pressing cuff
72. Back plate
72a. Groove
73. Sensing cuff
81. Air bag
82. Tube
83. Connector
86. Sheet member
86a. First sheet member
86a1. Outer surface
86b. Second sheet member
86b1. Opening
86c. Third sheet member
86c1. Opening
86d. Fourth sheet member
91. Air bag
92. Tube
93. Connector
96. Sheet member
96a. Fifth sheet member
96b. Sixth sheet member
100. Wrist
110. Artery
200. Charging cable
210. Connector
211. Main body
212. Connection terminal
213. Clip unit (fixing unit)
213a. Rotary shaft
214. Guide

The invention claimed is:

1. A blood pressure measuring device comprising:
a device main body;
a curler configured to bend along a circumferential direction of a wrist from the device main body, including one end and another end separated from each other, and further configured to be fixed to the device main body, the curler being configured so that:
an outer surface of the curler on a one end side of the curler is fixed to the device main body,
the one end protrudes to one side of the wrist from the device main body,
the one end and the another end are adjacent to each other,
the one end and the another end are connected along a circumferential axis of the curler, and a furthest end point along the circumferential axis of the curler of the one end and a furthest end point along the circumferential axis of the curler of the another end extend outward from the device main body, and a length from the device main body to the furthest end point of the one end is smaller than a length from the device main body to the furthest end point of the another end, and
the another end extends from a dorsal side of the wrist to a palmar side of the wrist, is arranged on the one end side, and is adjacent to the one end;
a first strap provided on an outer side surface of the device main body and configured to cover the outer surface of the curler;
a second strap provided on the outer side surface of the device main body and configured to cover the outer surface of the curler, the first strap and the second strap being provided at symmetrical positions;
the first strap and the second strap can be spaced apart from the outer surface of the curler;
a cuff structure provided on a periphery of an inner surface of the curler and configured to be inflated by a fluid; and
a power feed unit provided on the outer surface at the one end side of the curler protruding from the device main body, wherein the power feed unit includes a power feed terminal, and the power feed terminal is arranged on the outer surface of the one end of
the curler and the power feed terminal is an exposed surface, wherein:
the curler includes a recess on the outer surface at the one end protruding from the device main body;
the power feed unit includes a wiring unit provided in the recess and the power feed terminal provided in the recess and connected to the wiring unit;
the device main body comprises a power supply unit which is a secondary battery and a control substrate to which power is configured to be supplied by the power supply unit; and
the power supply unit is configured to be charged with power supplied by the power feed unit.

2. The blood pressure measuring device according to claim 1, wherein:
the edge of the one end is an outermost edge;
the edge of the another end is an outermost edge; and
the edge of the one end is on an opposite end of the curler from the edge of the another end.

3. The blood pressure measuring device according to claim 1, wherein:
either the first strap or the second strap are configured to cover the power feed terminal when not spaced apart from the outer surface of the curler.

* * * * *